(12) United States Patent
Marechal

(10) Patent No.: US 8,628,053 B2
(45) Date of Patent: Jan. 14, 2014

(54) SYSTEM FOR FASTENING A SEAT IN PARTICULAR AN AIRCRAFT SEAT AND SEAT COMPRISING AT LEAST ONE SUCH SYSTEM

(75) Inventor: Xavier Marechal, Paris (FR)

(73) Assignee: ATTAX, Carrieres sur Seine (FR)

( * ) Notice: Subject to any disclaimer, the term of this patent is extended or adjusted under 35 U.S.C. 154(b) by 263 days.

(21) Appl. No.: 12/963,115

(22) Filed: Dec. 8, 2010

(65) Prior Publication Data
US 2011/0133032 A1   Jun. 9, 2011

(30) Foreign Application Priority Data
Dec. 9, 2009 (FR) .................................... 09 58794

(51) Int. Cl.
*A47B 97/00* (2006.01)

(52) U.S. Cl.
USPC ........ 248/503.1; 248/424; 248/429; 410/104; 410/105; 244/118.5; 244/118.6; 244/122 R

(58) Field of Classification Search
USPC ............ 248/424, 429, 205.1, 220.21, 220.22, 248/231.51, 274.1, 276.1, 292.12, 309.1, 248/500, 503, 503.1; 410/104, 105; 296/65.03; 297/311; 244/118.1, 118.5, 244/118.6, 122 R, 131
See application file for complete search history.

(56) References Cited

U.S. PATENT DOCUMENTS

| | | | | |
|---|---|---|---|---|
| 4,089,275 A * | 5/1978 | Pelletier | ........................ | 410/79 |
| 4,213,593 A | 7/1980 | Weik | | |
| 7,785,053 B2 * | 8/2010 | Hudson | ........................ | 410/105 |
| 7,975,979 B2 * | 7/2011 | Bishop | ........................ | 248/429 |
| 8,251,623 B2 * | 8/2012 | Marechal | ........................ | 410/105 |
| 8,360,386 B2 * | 1/2013 | Marechal | ................... | 248/503.1 |
| 8,496,220 B2 * | 7/2013 | Marechal | ................... | 248/503.1 |
| 8,517,310 B2 * | 8/2013 | Marechal | ................. | 244/122 R |

FOREIGN PATENT DOCUMENTS

WO   2007/133823 A1   11/2007

* cited by examiner

*Primary Examiner* — Todd M. Epps
(74) *Attorney, Agent, or Firm* — Sughrue Mion, PLLC

(57) ABSTRACT

This system comprising a base (2) provided in the vicinity of one of its ends with means in the form of jaws (3) for clamping and blocking in position of the system in the rail by pinching the latter between the base (2) and laterally protruding portions (4) of these means in the form of jaws (3), the base (2) and the means in the form of jaws (3) able to be displaced in relation to one another between a mounting/dismounting position of the system in the rail and a blocking position of the system by clamping around the rail, by the intermediary of the means of manoeuvring (6) that can be actuated by an operator, is characterized in that the means of manoeuvring (6) include a slide (7) which can be displaced in the base (2) by the operator and comprising at one end, a surface for manoeuvring (8) by the operator, at the other end, a ramp portion adapted (9) to cooperate with an additional ramp portion (10) of the means in the form of jaws (3) in order to displace the latter in relation to the base between the mounting/dismounting position and the blocking position, and in its intermediate portion, means that can be disengaged (11) for blocking in position of the slide (7) in the base (2) and therefore of the system in relation to the rail.

Figure 1:
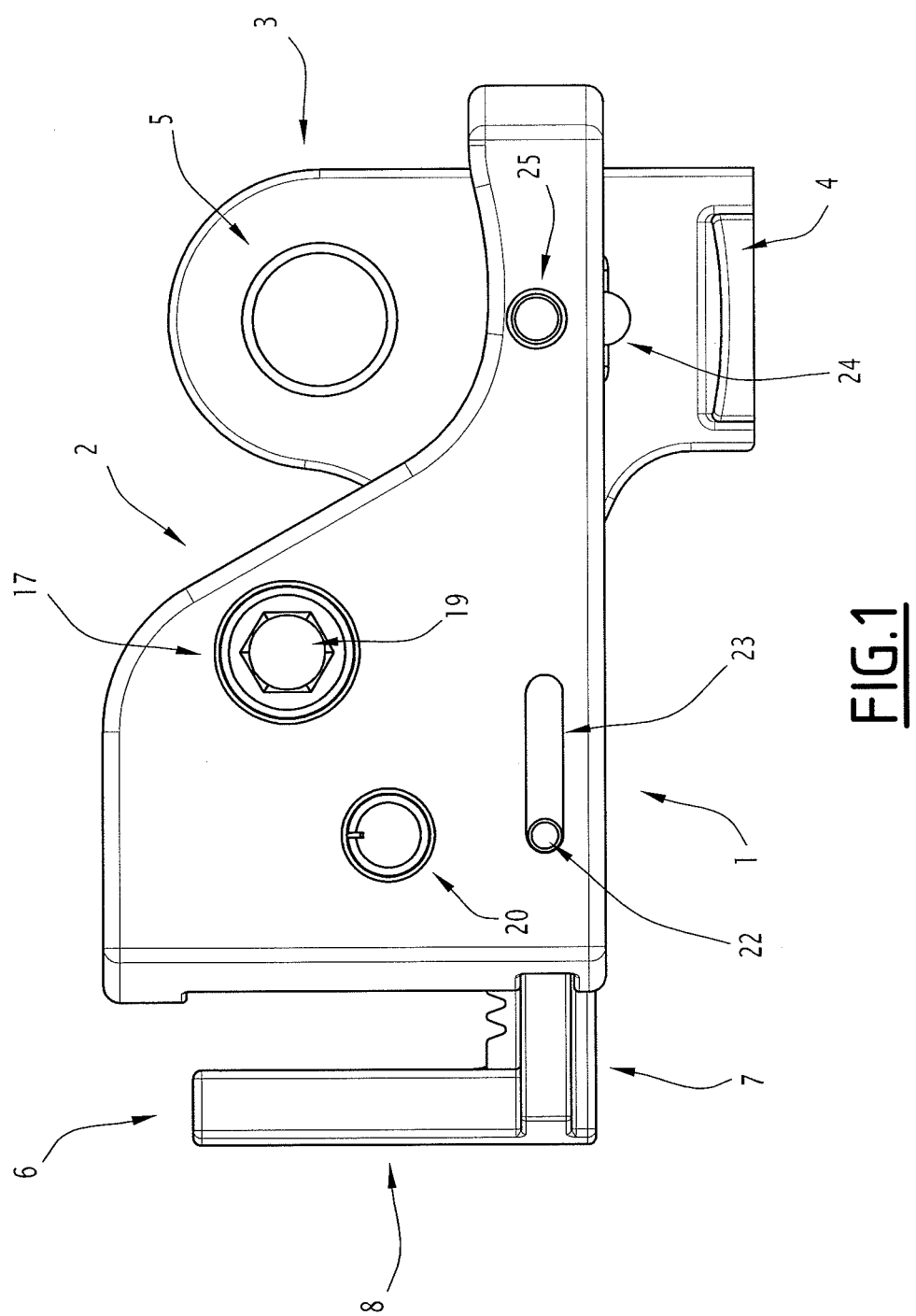

12 Claims, 5 Drawing Sheets

SYSTEM FOR FASTENING A SEAT IN PARTICULAR AN AIRCRAFT SEAT AND SEAT COMPRISING AT LEAST ONE SUCH SYSTEM

This invention relates to a fastening system of a seat in particular an aircraft seat and a seat comprising at least such a system.

It is already known in prior art, systems for fastening seats for this type of application, which are adapted in order to provide for the fastening of a seat in a rail of the rest of the aircraft.

Generally, such a fastening system includes a base provided in the vicinity of one of its ends, means in the form of jaws for clamping and blocking in position of the system in the rail, by pinching the latter between the base and laterally protruding portions of these means in the form of clamping jaws.

The base and the means in the form of clamping jaws are then able to be displaced in relation to one another between a first separated mounting/dismounting position of the system in the rail, and a second closer blocking position of the system by clamping around the rail, by the intermediary of means of manoeuvring that can be actuated by a mounting/dismounting operator.

In the more simple versions of these fastening systems, the means of manoeuvring that can be actuated by the mounting/dismounting operator in order to provide for the blocking of the system in position, include a clamping screw.

According to other embodiments, these means include means with cam, with lever, etc.

However all of these systems have a certain number of disadvantages in particular concerning the quality and the reliability of the blocking in position, due in particular to an imbalance on forces exerted by the means of blocking.

The purpose of the invention is therefore to overcome these problems.

To this effect the invention has for object a fastening system of a seat in particular of an aircraft seat in a rail of the rest of this aircraft, of the type comprising a base provided in the vicinity of one of its ends means in the form of jaws for clamping and blocking in position of the system in the rail by pinching the latter between the base and laterally protruding portions of these means in the form of clamping jaws, the base and the means in the form of clamping jaws able to be displaced in relation to one another between a first separated mounting/dismounting position of the system in the rail and a second closer blocking position of the system by clamping around the rail, by the intermediary of means of manoeuvring that can be actuated by a mounting/dismounting operator, characterised in that the means of manoeuvring include a slide which can be displaced in the base by the operator and comprising at one end, a surface for manoeuvring by the operator, at the other end, a ramp portion adapted to cooperate with an additional ramp portion of the means in the form of clamping jaws in order to displace the latter in relation to the base between the first separated mounting/dismounting position of the system in the rail and the second closer blocking position of the system in relation to the rail, and in its intermediate portion, means that can be disengaged for blocking in position of the slide in the base and therefore of the system in relation to the rail.

According to other aspects of the invention, the fastening system of a seat includes one or several of the following characteristics:

- the surface for manoeuvring the slide is accessible for the operator at the end of the base opposite that wherein are provided the means in the form of clamping jaws,
- the means that can be disengaged for blocking in position of the slide comprise a portion in the form of a rack of the intermediate portion of the latter, adapted to cooperate with a portion in the form of a pinion of a blocking wheel mounted in rotation in the base and of which another portion is present in the form of a ratchet wheel, adapted to cooperate with a backstop ratchet which can be displaced by the operator of an active blocking position of the blocking wheel towards a retracted position in order to release this blocking wheel,
- the backstop ratchet is articulated to the base by the intermediary of an articulation rod, in that is provided means of elastic activation of the ratchet in active portion and in that is provided means of displacing of the ratchet towards its retracted position, that can be actuated by a tool made available to the operator,
- the means of displacing of the ratchet towards its retracted position include a pocket of the articulation rod of the ratchet in the base, adapted to receive a tool making it possible for the operator to retract this ratchet by pivoting the latter around the axis of the articulation rod,
- the pocket is a hollow pocket arranged in at least one of the ends of the articulation rod and accessible from the exterior of the base in order to allow the operator to engage the tool in the latter,
- the base, the slide and the means in the form of jaws respectively, comprise guiding means of their relative displacements,
- the guiding means include portions protruding from one of the parts adapted to cooperate with the holes of the other portion,
- it comprises means of elastic activation of the slide in retracted position, and
- the means of elastic activation comprise a spiral spring associated to the blocking wheel.

According to another aspect, the invention also relates to a seat comprising at least one such system.

Figure 2:
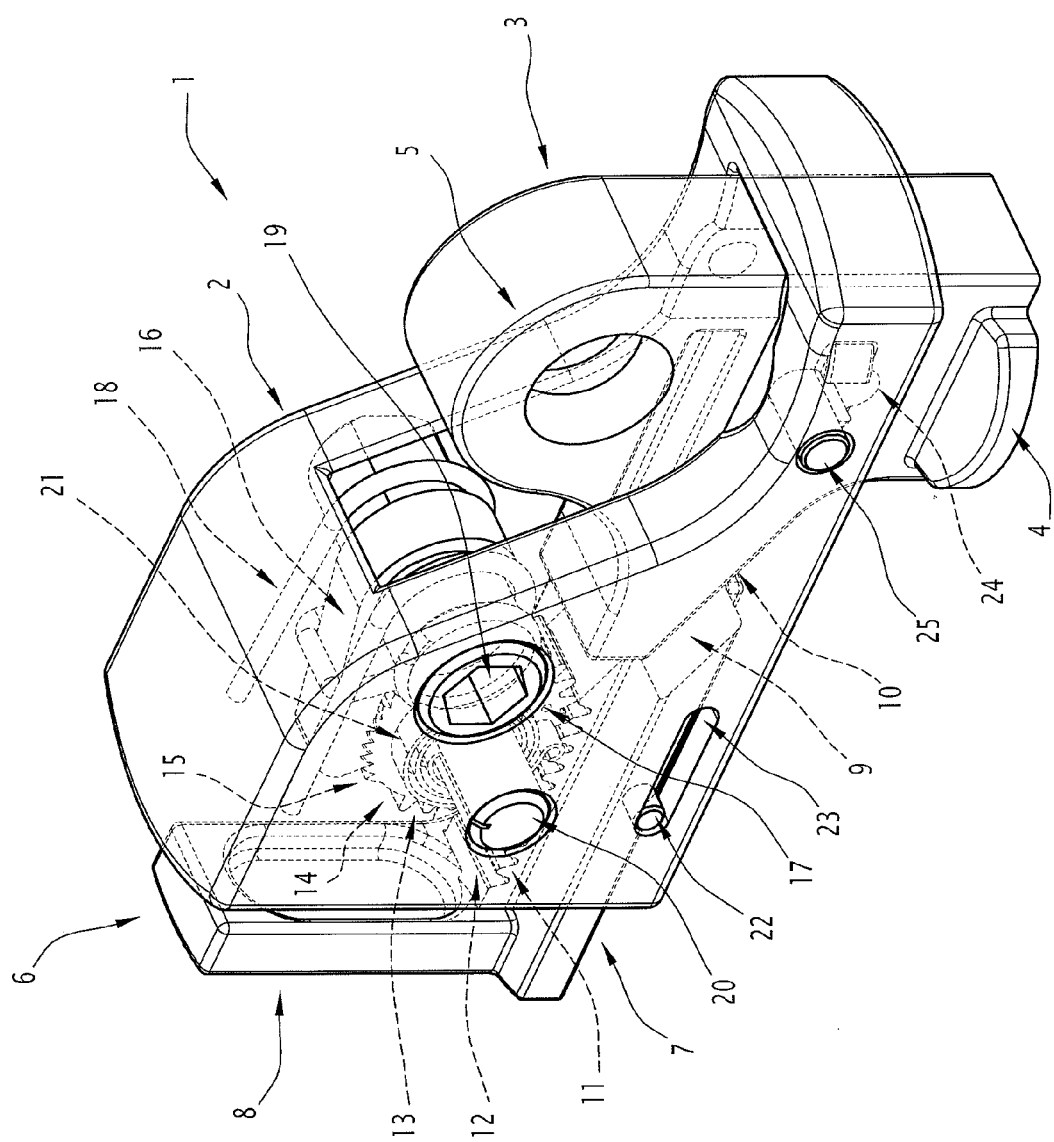
Figure 3:
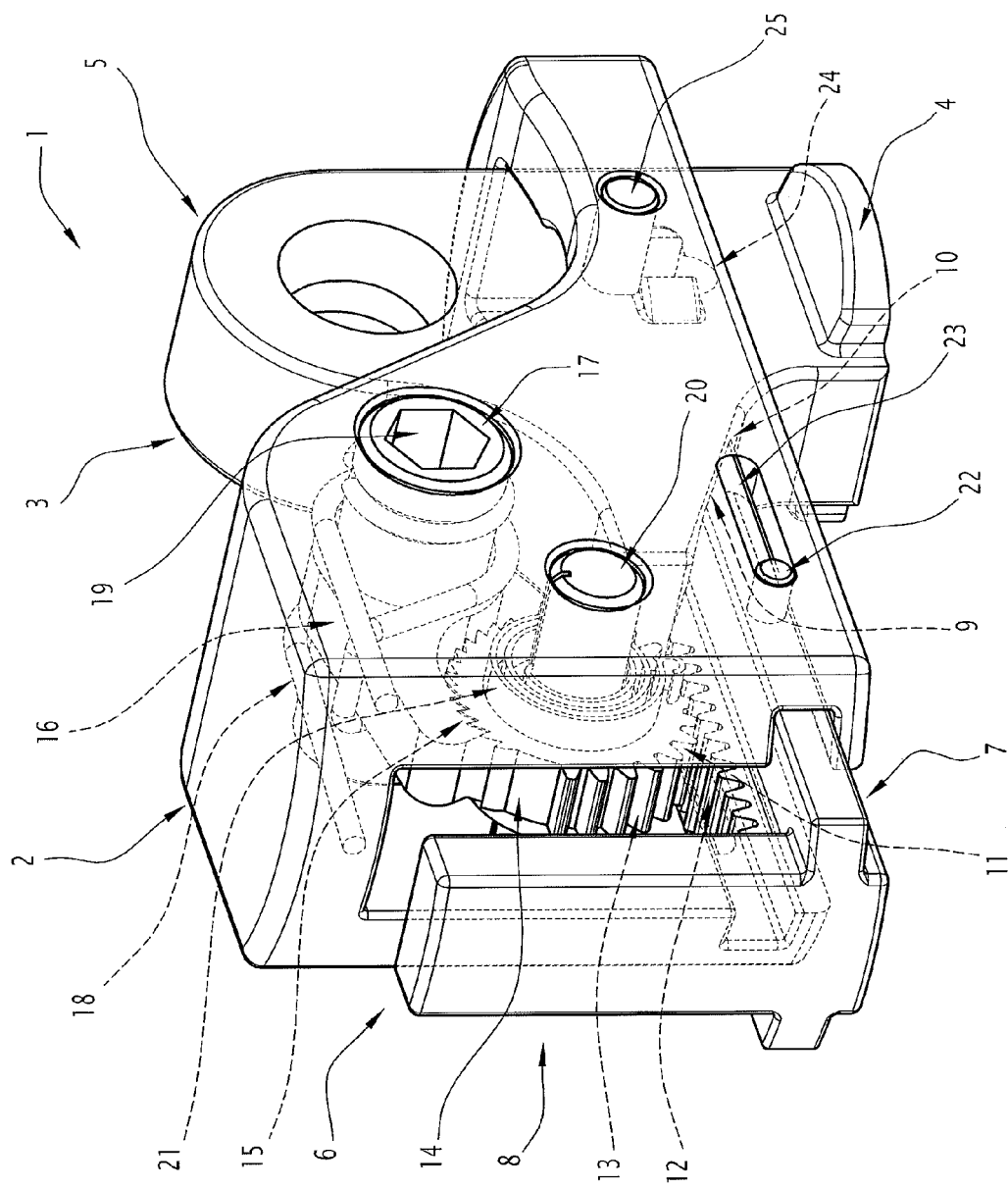
Figure 4:
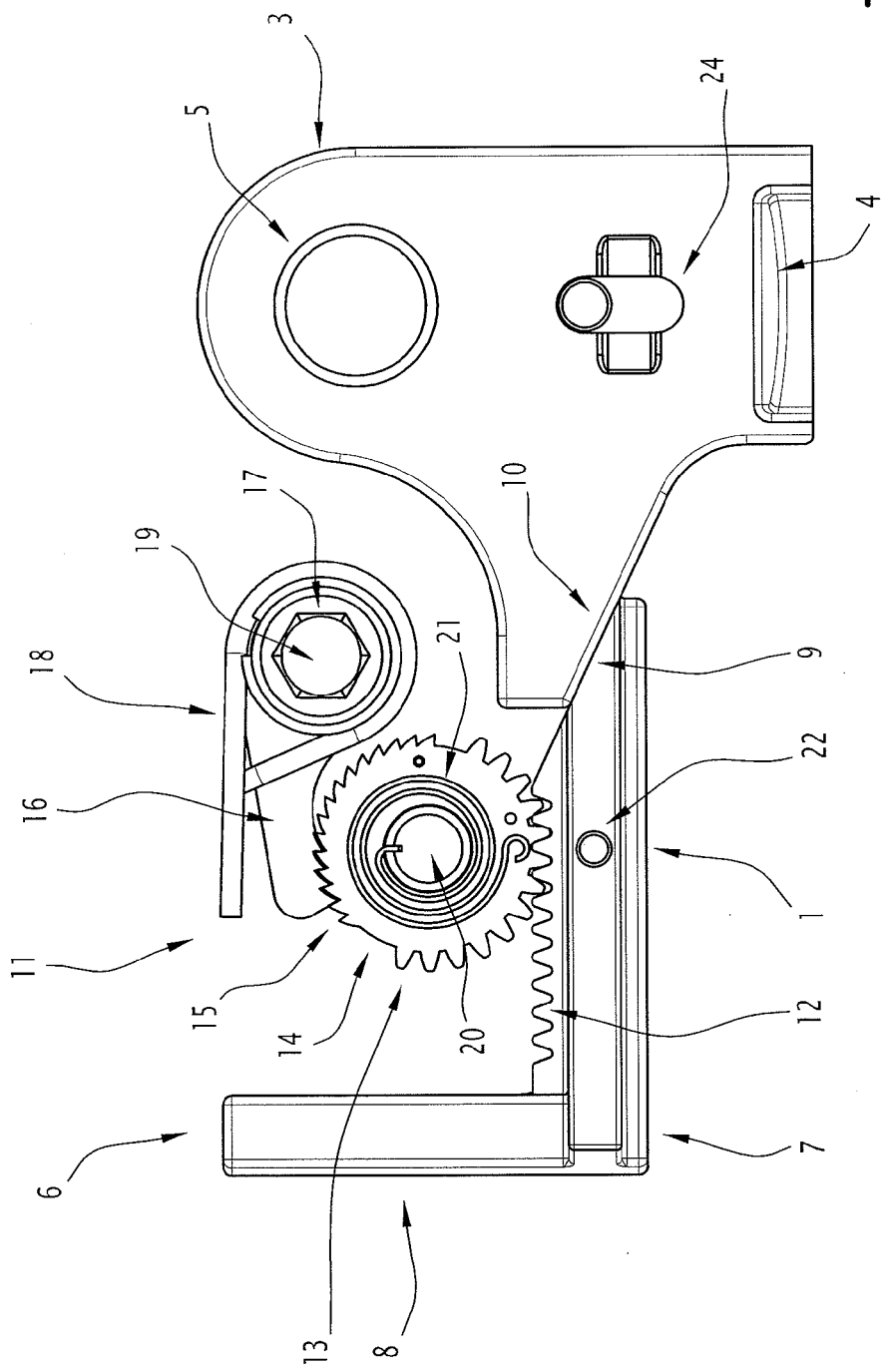
Figure 5:
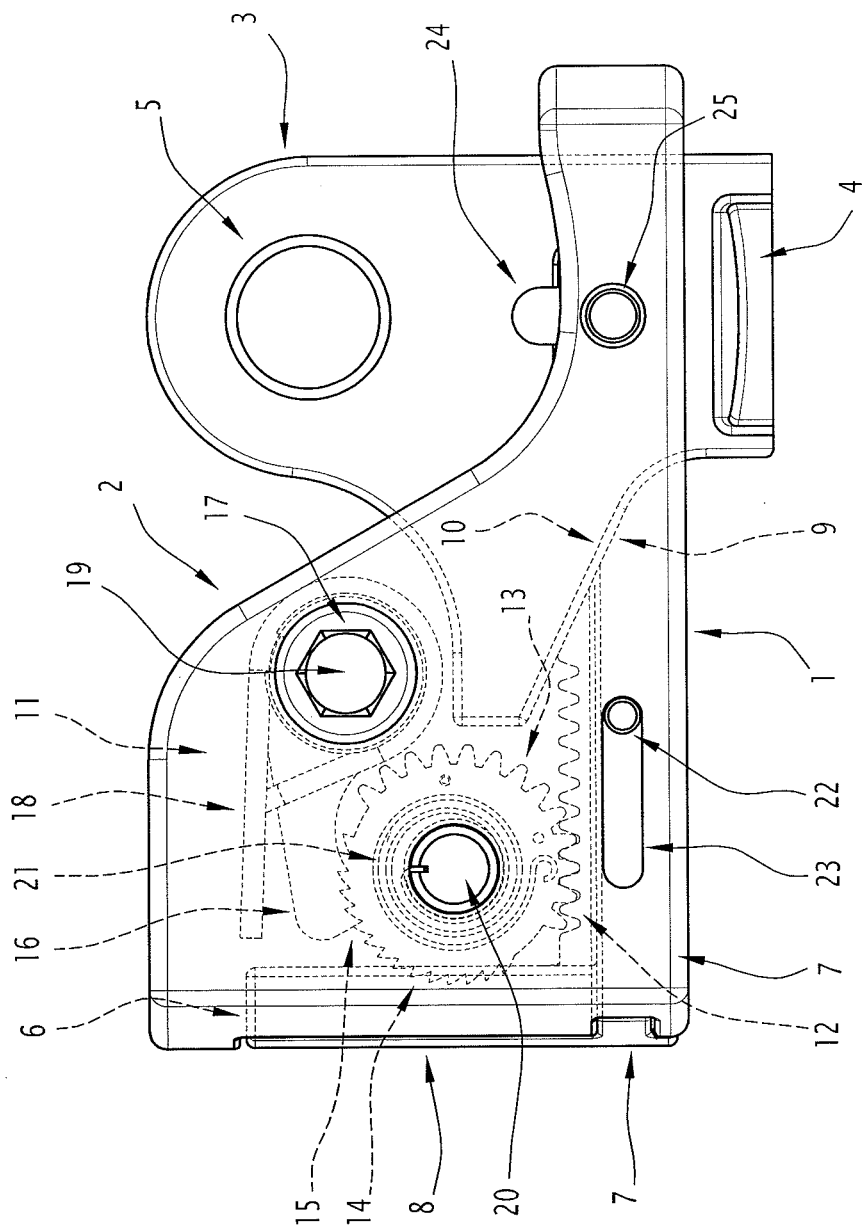

The invention shall be better understood using the description which shall follow provided solely by way of example and made in reference to the annexed drawings, wherein:

FIG. 1 shows a side view showing the general structure of a fastening system of a seat, according to the invention, FIGS. 2 and 3 show perspective front and rear views of such a fastening system, the base being shown in transparency in order to show the internal structure of the fastening system, FIG. 4 shows a side view of the internal elements of the system, and FIG. 5 shows a side view showing such a system in blocking position.

It is indeed shown in these figures, a fastening system of a seat in particular of an aircraft seat.

This system is designated by the general reference 1 in these figures and makes it possible conventionally to fasten an aircraft seat in a rail of the rest of this aircraft.

Also conventionally, this system comprises a base designated by the general reference 2 provided in the vicinity of one of its ends, means in the form of jaws for clamping and blocking in position of the system in the rail, by pinching the latter between the base and laterally protruding portions of these means in the form of clamping jaws.

The means in the form of clamping jaws are designated by the general reference 3 in this figure, these means comprising laterally protruding portions of which one is for example designated by the general reference 4.

Note that in the example embodiment shown, the rest of the seat is connected to these means in the form of clamping jaws for example on a fastening zone designated by the general reference 5 of the latter.

The base and the means in the form of clamping jaws can be displaced in relation to one another between a first separated mounting/dismounting position of the system in the rail, such as is shown for example in FIG. 1 and a second closer blocking position of the system by clamping around the rail such as is shown for example in FIG. 5.

The base and the means in the form of clamping jaws are mounted in a displaceable manner by the intermediary of means of manoeuvring that can be actuated by a mounting/dismounting operator.

These means of manoeuvring are designated for example by the general reference 6 in these figures.

These means of manoeuvring include a slide designated by the general reference 7 in these figures, which can be displaced in the 2 by the operator and which comprises at one end, a surface for manoeuvring by the operator, designated by the general reference 8 in these figures, at the other end, a ramp portion designated by the general reference 9, adapted to cooperate with an additional ramp portion 10 of the means in the form of clamping jaws 3, in order to displace the latter in relation to the base 2 between the first separated mounting/dismounting position of the system in the rail and the second closer blocking position of the system in relation to the rail and in its intermediate portion, means that can be disengaged 11 of blocking in position of the slide 7 in the base 2 and therefore of the system in relation to the rail.

The surface for manoeuvring 8 of the slide 7 is accessible for the operator at the end of the base 2 opposite that wherein are provided the means in the form of clamping jaws 3, and this surface for manoeuvring can for example have the form of a bearing zone that the operator accesses and pushes in order to displace the system between its retracted position and its active portion.

The means that can be disengaged 11 of blocking in position of the slide 7 comprise a portion in the form of a rack of the intermediate portion of this slide, this portion in the form of a rack being designated by the general reference 12 and being adapted to cooperate with a portion in the form of a pinion 13 of a blocking wheel 14 mounted in rotation in the base 2.

Another portion of this blocking wheel 14 has the form of a ratchet wheel designated by the general reference 15 in this figure, which is adapted to cooperate with a backstop ratchet designated by the general reference 16, which can be displaced by the operator from an active blocking position of the blocking wheel 14 towards a retracted position in order to release this blocking wheel.

In fact and as is shown, the backstop ratchet 16 is articulated to the base 2 by the intermediary of an articulation rod designated by the general reference 17 in these figures and it is provided means of elastic activation of this ratchet in active blocking position.

These means of elastic activation of the ratchet in active portion are for example formed by a hairpin spring, designated by the general reference 18 in these figures and it is provided means of displacing of the ratchet towards its retracted position, that can be actuated by a tool made available to the mounting/dismounting operator.

In the example embodiment shown, the means of displacing of the ratchet towards its retracted position include a pocket of the articulation rod 17 of the latter in the base 2, this pocket being adapted to receive a tool making it possible for the operator to retract this ratchet by pivoting for example one-quarter turn of the latter around the axis of the articulation rod 17.

According to the example embodiment shown, the pocket is a hollow pocket designated by the general reference 19 in these figures, arranged at least one of the ends of the articulation rod 17 and accessible from the exterior of the base 2 in order to allow the operator to engage the tool in the latter.

The blocking wheel 14 is also mounted in rotation in the base on a mounting rod designated by the general reference 20 in these figures.

In addition it is provided means of elastic activation of the slide 7 in retracted position.

In the example embodiment shown in these figures, these means of elastic activation are formed by a spiral spring designated by the general reference 21, interposed between the mounting rod 20 and the blocking wheel 14.

Note finally that the base 2, the slide 7 and the means in the form of clamping jaws 3 comprise guiding means of their relative displacements.

In the example embodiment shown, these guiding means include portions protruding from one of the portions adapted to cooperate with holes of the other portion.

As such for example the slide 7 comprises protruding portions such as the protruding portion designated by the general reference 22 in these figures, adapted to cooperate with a hole 23 of the base.

Likewise the means in the form of clamping jaws 3 can comprise a hole 24 adapted to be displaced around a protruding portion 25 of the base 2.

The operation of such a fastening system is as follows.

Before its mounting in the rail, the system is as is shown in FIG. 1, i.e. the slide 7 is in its first position thus allowing the means in the form of clamping jaws and the base to be separated from one another is such a way as to allow for the mounting in position of the fastening system and therefore of the seat in relation to the rail of the aircraft.

Once the seat and the fastening system are in correct position, the operator drives the slide 7 in order to displace it in the base by actuating the bearing 8 of the latter.

During this displacement, the portion in the form of a rack 12 of the intermediate portion of this slide 7 drives the blocking wheel 14 in rotation bringing the backstop ratchet 16 to cross the corresponding catches of the portion in ratchet wheel of this wheel 14 in order to prevent any returning backwards of the slide 7.

At the same time the slide 7 advancing inside the base 2, its portion in the form of a ramp 9 raising the means in the form of clamping jaws 3 by taking bearing on the portion in the form of an additional ramp 10 of the latter.

This displacement thus makes possible for the fastening system to block itself in position in relation to the rail, this rail being clamped and pinched between the base 2 and the lateral protruding portions for example 4 of the means in the form of clamping jaws 3.

When the operator desires to unblock the system with the purpose for example of dismounting the seat, he engages a corresponding tool such as for example an allen spanner, into the hollow pocket 19 of the articulation rod 17. He then manoeuvres the spanner in order to displace for example by one-quarter turn, the articulation rod 17 and therefore the ratchet 16 against the elastic activation of means 18, in order to release the blocking wheel 14.

This, under the effect of the spiral spring 21 drives a displacement of the slide 7 towards a retracted position of releasing the means in the form of jaws 3. These means in the form of jaws are displaced then towards a position of unblocking of the system in relation to the rail, which makes it possible to dismount the latter.

As has been indicated previously, the various displacements of these portions are guided by the intermediary of the protruding portions and the corresponding holes of these portions.

It is of course understood that other embodiments can be considered.

The invention claimed is:

1. Fastening system for a seat, comprising:
   a base;
   a jaw means provided in the vicinity of one end of the base for clamping and blocking in position the system in a rail by pinching the rail between the base and laterally protruding portions of the jaw means in the form of a clamping jaw, the base and the jaw means are configured to be displaced in relation to each other between a first separated mounting/dismounting position of the system in the rail and a second closer blocking position of the system by clamping the rail;
   a maneuvering means for maneuvering the fastening system between the first separated mounting/dismounting position and the second closer blocking position, the maneuvering means capable of being actuated by a mounting/dismounting operator,
   wherein the maneuvering means include a slide which can be displaced in the base by the operator and comprising at one end, a surface for maneuvering by the operator, and at the other end, a ramp portion adapted to cooperate with an additional ramp portion of the jaw means in order to displace the jaw means in relation to the base between the first separated mounting/dismounting position of the system in the rail and the second closer blocking position of the system in relation to the rail, and in an intermediate portion of the base, a means that can be disengaged for blocking in position the slide in the base.

2. Fastening system for a seat according to claim 1, wherein in that the surface for manoeuvring the slide is accessible for the operator at the end of the base opposite that wherein are provided the jaw means.

3. Fastening system for a seat according to claim 1, wherein the means that can be disengaged (11) for blocking in position the slide comprise a portion in the form of a rack of the intermediate portion of the latter, adapted to cooperate with a portion in the form of a pinion of a blocking wheel rotatably mounted in the base and of which another portion has the form of a ratchet wheel, adapted to cooperate with a backstop ratchet which can be displaced by the operator from an active blocking position of the blocking wheel towards a retracted position in order to release the blocking wheel.

4. Fastening system for a seat according to claim 3, wherein the backstop ratchet is attached to the base by an articulation rod, the fastening system comprises means of elastic activation of the ratchet in an active portion having means for displacing the ratchet towards the retracted position that can be actuated by a tool made available to the operator.

5. Fastening system for a seat according to claim 4, wherein the means of displacing the ratchet towards the retracted position include a pocket of the articulation rod of the ratchet in the base, adapted to receive a tool making it possible for the operator to retract the ratchet by pivoting that ratchet around the axis of the articulation rod.

6. Fastening system for a seat according to claim 5, wherein the pocket is a hollow pocket arranged in at least one of the ends of the articulation rod and accessible from the exterior of the base in order to allow the operator to engage the tool into the latter.

7. Fastening system for a seat according to claim 1, wherein the base (2), the slide (7) and the jaw means respectively, comprise guiding means for their relative displacements.

8. Fastening system for a seat according to claim 7, wherein the guiding means include protruding portions of one of the portions adapted to cooperate with holes of the other portion.

9. Fastening system for a seat according to claim 1, further comprising means for elastic activation of the slide in retracted position.

10. Fastening system for a seat according to claim 9, wherein the means for elastic activation comprise a spiral spring associated with the blocking wheel.

11. Fastening system for a seat according to claim 1, wherein the seat is connected to the jaw means.

12. Seat in particular an aircraft seat, wherein said seat comprises at least one fastening system according to any of the preceding claims.

* * * * *